(12) United States Patent
Traeger

(10) Patent No.: US 11,317,761 B2
(45) Date of Patent: May 3, 2022

(54) DOUBLE-SEALED HIGH-TEMPERATURE RESISTANT DC IGNITOR FOR USE WITH WOOD PELLET BURNER ASSEMBLIES

(71) Applicant: ORIGINAL PELLET GRILL COMPANY LLC, Mount Angel, OR (US)

(72) Inventor: Joe Traeger, Mount Angel, OR (US)

(73) Assignee: Original Pellet Grill Company LLC, Mount Angel, OR (US)

( * ) Notice: Subject to any disclaimer, the term of this patent is extended or adjusted under 35 U.S.C. 154(b) by 107 days.

(21) Appl. No.: 16/855,923

(22) Filed: Apr. 22, 2020

(65) Prior Publication Data

US 2020/0245813 A1  Aug. 6, 2020

Related U.S. Application Data

(63) Continuation-in-part of application No. 15/454,680, filed on Mar. 9, 2017, now Pat. No. 10,670,276.
(Continued)

(51) Int. Cl.
*A47J 37/07*   (2006.01)
*F23Q 7/02*    (2006.01)
*F24B 15/00*   (2006.01)

(52) U.S. Cl.
CPC ....... *A47J 37/0786* (2013.01); *A47J 37/0754* (2013.01); *F23Q 7/02* (2013.01); *F24B 15/005* (2013.01)

(58) Field of Classification Search
CPC ..... A47J 37/0786; A47J 37/0754; F23Q 7/02; F23Q 7/04; F24B 15/005; F24B 1/024
See application file for complete search history.

(56) References Cited

U.S. PATENT DOCUMENTS

| 652,531 A | 6/1900 | Carlson |
| 1,779,453 A | 10/1930 | Taylor |

(Continued)

FOREIGN PATENT DOCUMENTS

| CN | 202754328 U | 2/2013 | |
| DE | 19928037 C1 * | 5/2000 | ............. F23Q 7/001 |

(Continued)

OTHER PUBLICATIONS

Bosch, Technical and Sales Information, unknown publish date, USA.

*Primary Examiner* — Jorge A Pereiro
(74) *Attorney, Agent, or Firm* — Renaissance IP Law Group, LLP; David A. Crowther

(57) ABSTRACT

Embodiments of the inventive concept provide a double-sealed high-temperature resistant DC ignitor for use with a wood pellet burner assembly. The DC ignitor includes a non-heating element portion. The non-heating element portion is connected to at least one of a battery or an AC to DC electrical transformer attached to the wood pellet burner assembly. A heating element is connected to the non-heating element portion, and extends by at least one inch into a combustion region of the wood pellet burner assembly. The heating element portion is configured to be heated by power received from the battery or the AC to DC electrical transformer. The DC ignitor provides safe, reliable, and fast combustion of wood pellets that congregate in a combustion region of the wood pellet burner assembly.

17 Claims, 14 Drawing Sheets

Related U.S. Application Data which is a continuation-in-part of application No. 14/120,192, filed on May 2, 2014, now abandoned.

(60) Provisional application No. 61/818,841, filed on May 2, 2013.

(56) References Cited

U.S. PATENT DOCUMENTS

| | | | |
|---|---|---|---|
| 1,804,285 A | 5/1931 | C | |
| 2,444,985 A | 7/1948 | M | |
| 2,549,806 A * | 4/1951 | Hall | F23Q 7/04 219/261 |
| 2,738,742 A * | 3/1956 | Campbell | F23B 90/02 110/190 |
| 2,831,913 A * | 4/1958 | Okenfuss | H01F 27/02 174/51 |
| 3,279,452 A | 10/1966 | W et al. | |
| 3,305,067 A | 2/1967 | Mayer | |
| 3,361,184 A | 1/1968 | Elzy | |
| 3,474,725 A | 10/1969 | L | |
| 3,683,791 A | 8/1972 | J | |
| 3,809,056 A | 5/1974 | Snelling | |
| 3,882,767 A | 5/1975 | Oyler | |
| 3,982,522 A | 9/1976 | Hottenroth et al. | |
| 4,325,310 A | 4/1982 | Babbage | |
| 4,362,093 A | 12/1982 | Griscom | |
| 4,373,430 A * | 2/1983 | Allen | A21C 13/00 126/20 |
| 4,495,860 A | 1/1985 | Hitch et al. | |
| 4,553,927 A * | 11/1985 | Collins, Jr. | H01T 13/04 313/118 |
| 4,572,062 A | 2/1986 | Widdowson | |
| 4,700,618 A | 10/1987 | Cox | |
| 4,721,037 A | 1/1988 | Blosnich | |
| 4,742,209 A * | 5/1988 | Minegishi | F23Q 7/001 123/145 A |
| 4,823,684 A | 4/1989 | Traeger et al. | |
| 4,989,521 A | 2/1991 | Traeger et al. | |
| 5,123,360 A | 6/1992 | Burke et al. | |
| 5,144,941 A | 9/1992 | Saito et al. | |
| 5,251,607 A | 10/1993 | Traeger et al. | |
| 5,263,642 A | 11/1993 | Orchard | |
| 5,304,778 A * | 4/1994 | Dasgupta | F23Q 7/001 123/145 A |
| 5,429,110 A | 7/1995 | Burke et al. | |
| 6,346,688 B1 * | 2/2002 | O'Donnell | F23Q 7/001 123/145 A |
| 6,539,787 B1 * | 4/2003 | Murai | F02D 35/023 73/114.21 |
| 6,881,930 B2 * | 4/2005 | Yoshikawa | F23Q 7/001 123/145 A |
| 6,896,732 B2 | 5/2005 | Fickett et al. | |
| 6,979,801 B2 * | 12/2005 | Okazaki | F02P 19/028 123/145 A |
| 8,020,547 B2 | 9/2011 | Hepper et al. | |
| 8,267,078 B2 | 9/2012 | Kuntz | |
| 9,140,448 B2 | 9/2015 | Freeman | |
| 2004/0020913 A1 * | 2/2004 | Hovorka | B29C 66/91641 219/243 |
| 2007/0012306 A1 * | 1/2007 | Looft | F23Q 7/04 126/6 |
| 2009/0059638 A1 * | 3/2009 | Homyk | H02M 5/14 363/154 |
| 2009/0293860 A1 | 12/2009 | Carlson | |
| 2010/0000982 A1 * | 1/2010 | Allgaier | F23Q 7/001 219/270 |
| 2010/0218754 A1 | 9/2010 | Kuntz | |
| 2011/0265779 A1 * | 11/2011 | Vandrak | F24H 9/02 126/93 |
| 2011/0297110 A1 | 12/2011 | Malatesta et al. | |
| 2012/0251958 A1 * | 10/2012 | Gross | F23Q 7/04 431/2 |
| 2013/0167826 A1 * | 7/2013 | Feld | H02K 7/14 126/299 D |
| 2013/0327259 A1 | 12/2013 | Freeman | |
| 2013/0330675 A1 * | 12/2013 | Strong | F23N 5/24 431/6 |
| 2014/0150698 A1 | 6/2014 | Walker | |

FOREIGN PATENT DOCUMENTS

| | | | | |
|---|---|---|---|---|
| GB | 921374 A * | 3/1963 | | F24H 3/0423 |
| KR | 2011066258 A * | 6/2011 | | F23B 40/00 |

* cited by examiner

DOUBLE-SEALED HIGH-TEMPERATURE RESISTANT DC IGNITOR FOR USE WITH WOOD PELLET BURNER ASSEMBLIES

RELATED APPLICATION DATA

This application is a continuation-in-part of co-pending, commonly-owned U.S. patent application Ser. No. 15/454,680, filed Mar. 9, 2017, which is a continuation-in-part of commonly-owned U.S. patent application Ser. No. 14/120,192, filed May 2, 2014, which claims the benefit of commonly-owned U.S. provisional patent application Ser. No. 61/818,841, filed May 2, 2013, which are hereby incorporated by reference.

TECHNICAL FIELD

The present invention relates generally to wood pellet-burning barbecues, and, more particularly, to a DC ignitor and a wood pellet burner for use with such barbecues.

BACKGROUND

Wood pellet-burning barbecues are popular for outdoor cooking. Conventional wood pellet-burning barbecues, of the type described in U.S. Pat. No. 4,823,684, employ a motor-driven auger to provide a measured feed of wood pellets into a combustion region where the pellets are burned to provide heat and smoke to cook food.

An aspect of such conventional wood pellet-burning barbecues is that the motor that drives the auger can require a steady supply of significant power as provided by, for example, an AC electrical power source. While convenient in outdoor settings of many homes, the required AC power or such barbecues has limited their portability and use where convenient AC power is not available such as at parks, sporting events, some camping areas, etc.

Moreover, conventional AC ignitors used in wood pellet-burner units are unreliable and have a short life-span. The ignitor is often the first component of a wood pellet-burner unit to fail. This is partly due to the harsh high-temperature environment under which ignitors are subjected, but can also be attributed to moisture build up, direct contact with the wood pellets, and materials by which they are constructed. Such disadvantages lead to frequent tripping of Ground Fault Interrupters (GFIs), which create a significant annoyance at best, and dangerous safety issues at worst for users. Conventional ignitors suffer from other problems such as long heat up times—as high as two minutes or more—to reach a temperature that is capable of igniting the wood pellets, and human shock safety problems.

Accordingly, a need remains for an improved wood pellet-burning unit ignitor, and for wood pellet burner assemblies that provide highly reliable and efficient operation of a wood pellet-burning barbecue, thereby enhancing the portability of wood pellet-burning barbecues. Embodiments of the inventive concept address these and other limitations in the prior art.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cellular network could be termed a second cellular network, and, similarly, a second cellular network could be termed a first cellular network, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
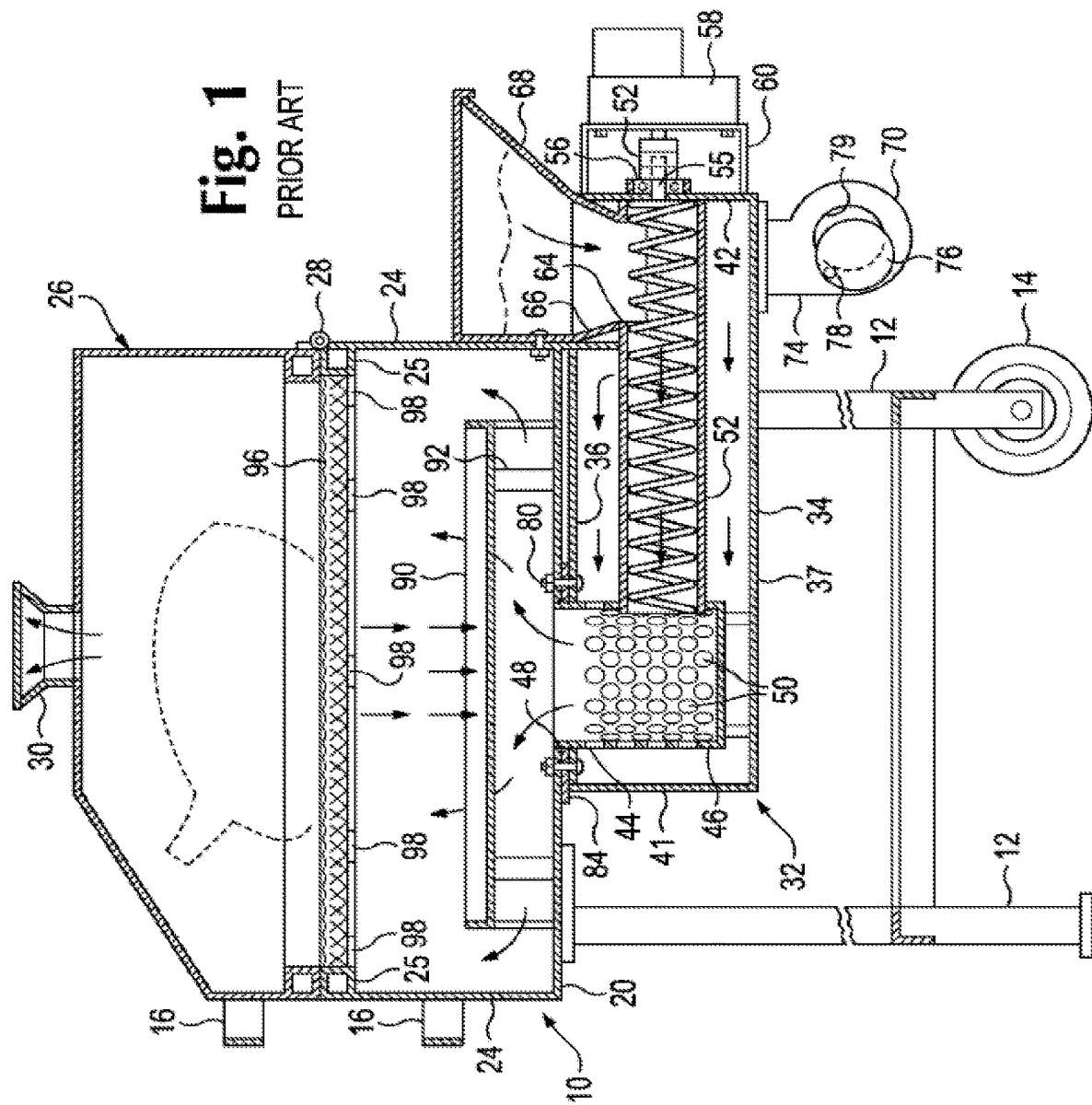
FIG. 1 illustrates a side elevation, with portions broken away, of a prior art wood pellet-burning barbecue in accordance with various embodiments of the present inventive concept.

FIG. 1 is a side elevation, with portions broken away, of a prior art pellet-burning barbecue 8 described in U.S. Pat. No. 4,823,684. Barbecue 8 is configured to place the top of a pan 10 at a convenient working height above the ground, through legs 12 secured to and extending downwardly from the base of the pan 10. For convenience of moving, if desired, wheels 14 are provided rotatably journaled on the base of two of the legs in the barbecue. For moving purposes, the barbecue may be partially raised utilizing handles 16 connected to the pan whereby ground contact is solely through those legs having wheels 14, the barbecue then being rollable to the position desired.

Figure 2:
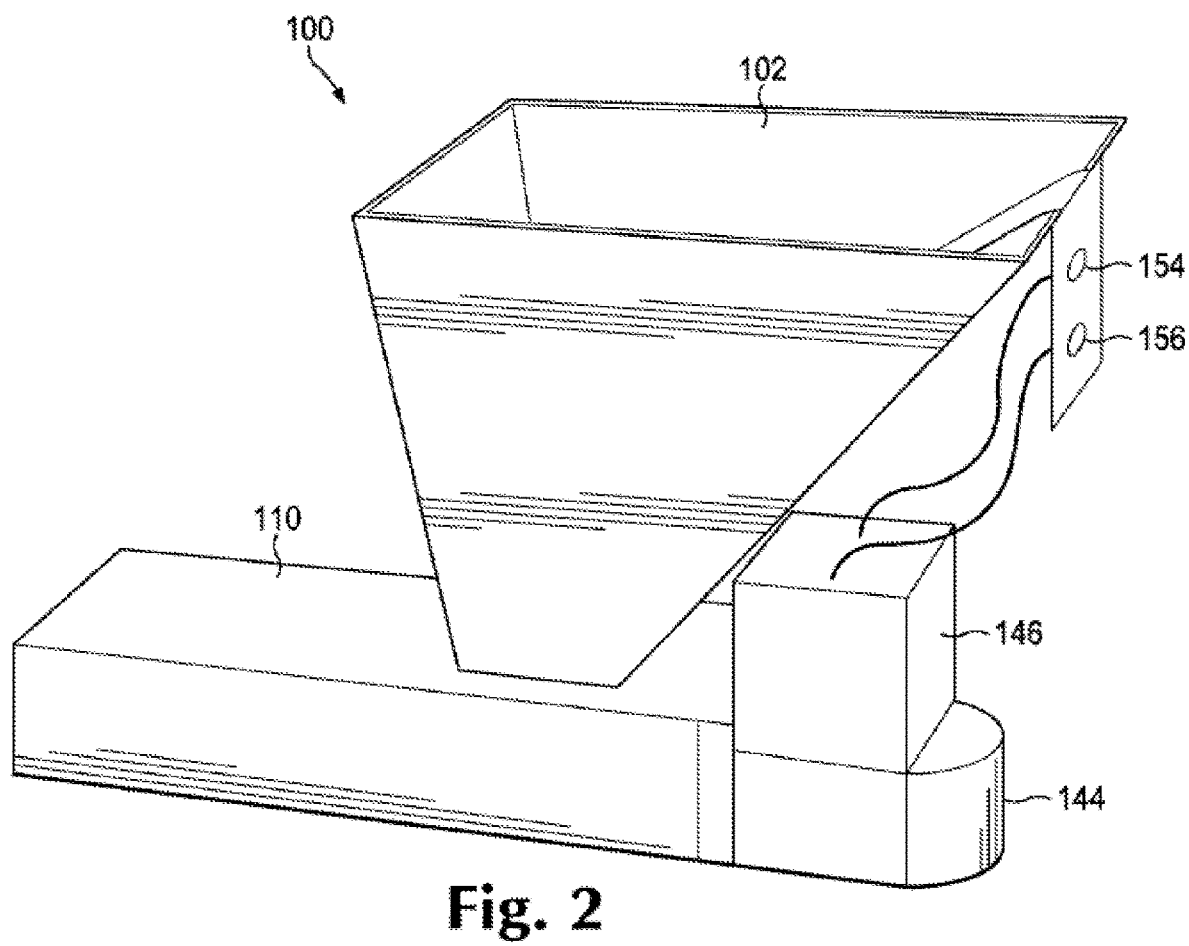
FIG. 2 illustrates side elevation of an implementation of a pellet burner assembly in accordance with various embodiments of the present inventive concept.

Pan 10 includes a bottom 20 and opposed side and end walls 22, 24 joined to bottom 20. The top of the pan may be reinforced as by framing 25. Pan 10 is open at the top. If desired, a hinged cover 26 may be included connected by hinges 28 to pan 10. The cover is swingable between a closed position where the cover closes off the top of the barbecue pan, as shown in FIG. 2, and an open position where the cover is swung to one side to expose the barbecue pan interior, as shown in FIG. 1. The cover may further include a ventilating hood as shown at 30.

A burner assembly 32 extends underneath the barbecue pan from approximately centrally of the pan to a position on one side thereof. In the specific embodiment of the invention disclosed, the burner assembly 33 includes an elongate housing 34 of substantially rectangular, i.e., square, cross section, and including top, bottom, and opposed side walls indicated at 36, 37, 38, and 39. The ends of the housing are closed off by end walls 41, 42.

Top wall 36 has a circular aperture 44 adjacent one end. Suitably secured as by welding within the housing and communicating with this aperture is a cylindrical fire pot 46 which is open at its top and closed at its bottom. The interior of the fire pot faces upwardly, and communicates with the interior of pan 10 through aperture 48 in bottom 20 of the pan.

The cylindrical wall of the fire pot contains perforations 50. With the construction described, the housing walls define a chamber extending along the interior of the housing and this chamber communicates through perforations 50 with the interior of the fire pot. Extending along the interior of housing 34 is a tube 52 having one end secured as by welding to the cylindrical wall of pot 46. The wall of the pot is cut out to provide an opening therein which communicates with the interior of tube 52. The opposite end of the tube is appropriately secured to end wall 42 of the housing.

Mounted within tube 52 is an elongate auger 54 terminating in a shaft 55. The shaft extends through wall 42 where it is supported in a bearing assembly 56. An electric gear motor 58 mounted on the end of the housing through bracket 60 has its output shaft connected through drive coupling 62 with the end of auger shaft 55.

Tube 52 is open at 64 and a wall 66 extending up from this opening provides a throat for the channeling of pellet fuel downwardly onto the auger to be fed thence by operation of the auger through the auger tube. A hopper 68 is supported on top of housing 34 which holds a supply of pellet fuel. The top wall of the housing is suitably cut away to place the base of the hopper in direct communication with the top of the throat defined by wall 66.

Supported on the underside of housing 34 approximately underneath the hopper is an electrically operated blower 70 having its discharge end connected through duct 74 with the chamber defined along the length of the interior of housing 34. A shutter 76 supported on the blower assembly by a pivot mounting 78 is adjustable to vary the degree of closure of intake 79 to the blower and, in this way, the amount of airflow produced by the blower through its discharge opening along the length of the housing.

The housing is supported on the underside of the pan through bolts 80, which extend upwardly from top wall 36 and through accommodating bores provided in the bottom of the pan, with securement completed using nuts screwed onto the protruding ends of the bolts.

Gasket material 84 may be provided intermediate the top wall of the housing and the underside of the barbecue pan. Additional securement of the housing beneath the barbecue pan may be provided by securing a portion of the hopper to the side of the pan in an appropriate manner.

Disposed within the interior of the barbecue pan somewhat upwardly from the top of the fire pot is a nonperforate, metallic, baffle pan or plate shown at 90 including a floor and a raised shoulder extending about its perimeter. The baffle plate extends in a region disposed over the top of the fire pot and outwardly from this region to edges disposed inwardly somewhat from the side walls of the barbecue pan. The baffle plate is removably supported in this position as by legs 92 which may be joined either to the underside of the baffle pan or to the base of the barbecue pan with their opposite extremities unsecured. A food-support means or grill 96 is mounted within the interior of the barbecue pan and directly adjacent the top thereof, such grill being supported on support lugs 98 joined to the side walls of the barbecue pan.

To start up the barbecue, the grill is removed and the baffle pan tipped to an upright position which exposes the top of the fire pot. A small amount of wood pellets, i.e., a handful, are then placed in the fire pot together with combustible material such as paper, and the like. This is then lit, and combustion allowed to proceed for a short period of time such as two minutes or so. The baffle pan and grill may then be replaced in their operative positions, the air blower started, and the auger motor started. This produces forced-air circulation down the interior of housing 34 with the air blowing inwardly into the fire pot to support combustion of the material therein. The operation of the auger produces a gradual feed of replacement pellets to the fire pot, replacing material as such is burned. Normally a warm-up period of only a few minutes is required alter replacement of the grill and before cooking may proceed.

Figure 3:
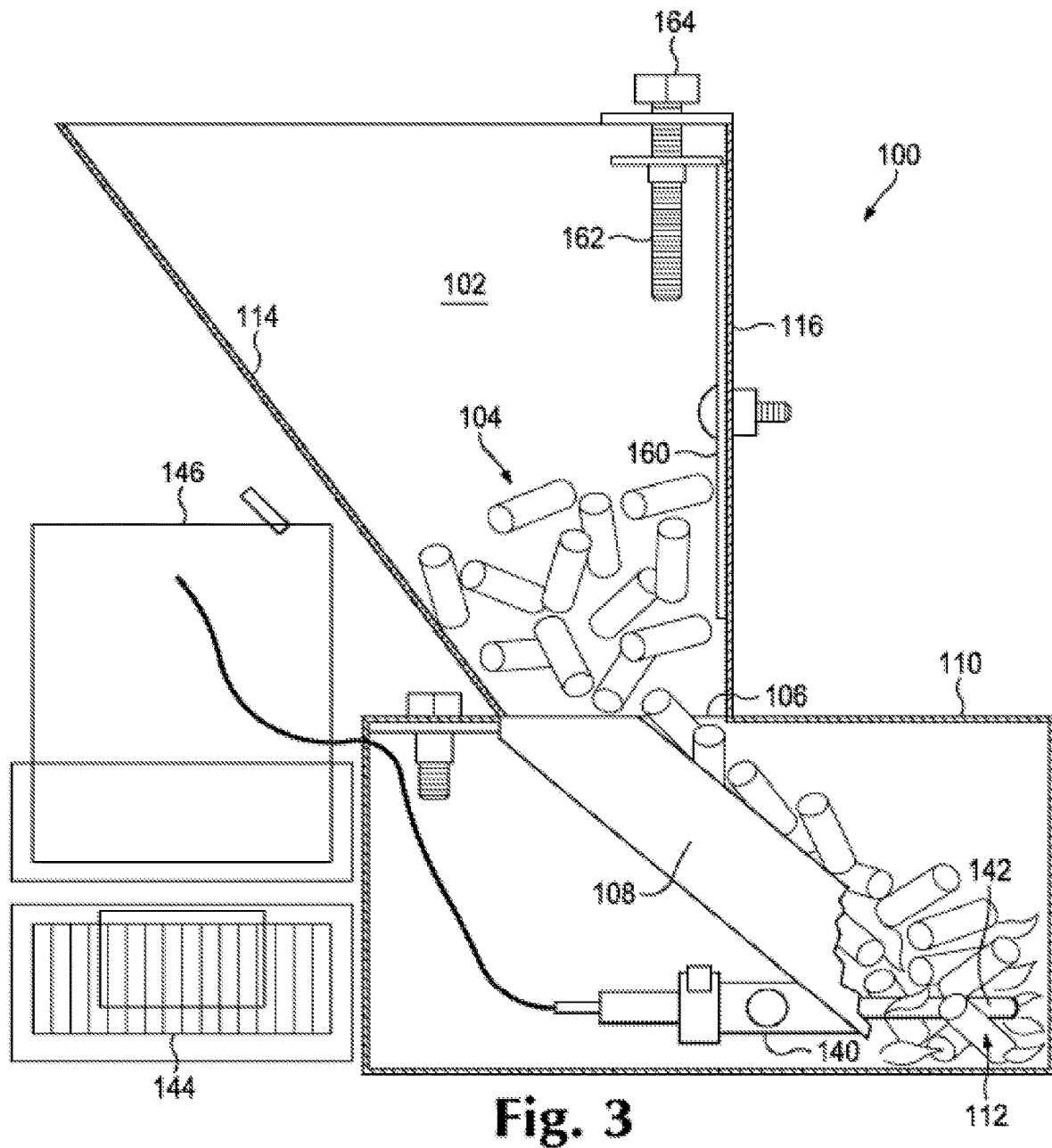
FIGS. 3 and 4 are sectional side views of the pellet burner assembly of FIG. 2 separately illustrating pellet fuel and airflow, respectively.
Figure 4:
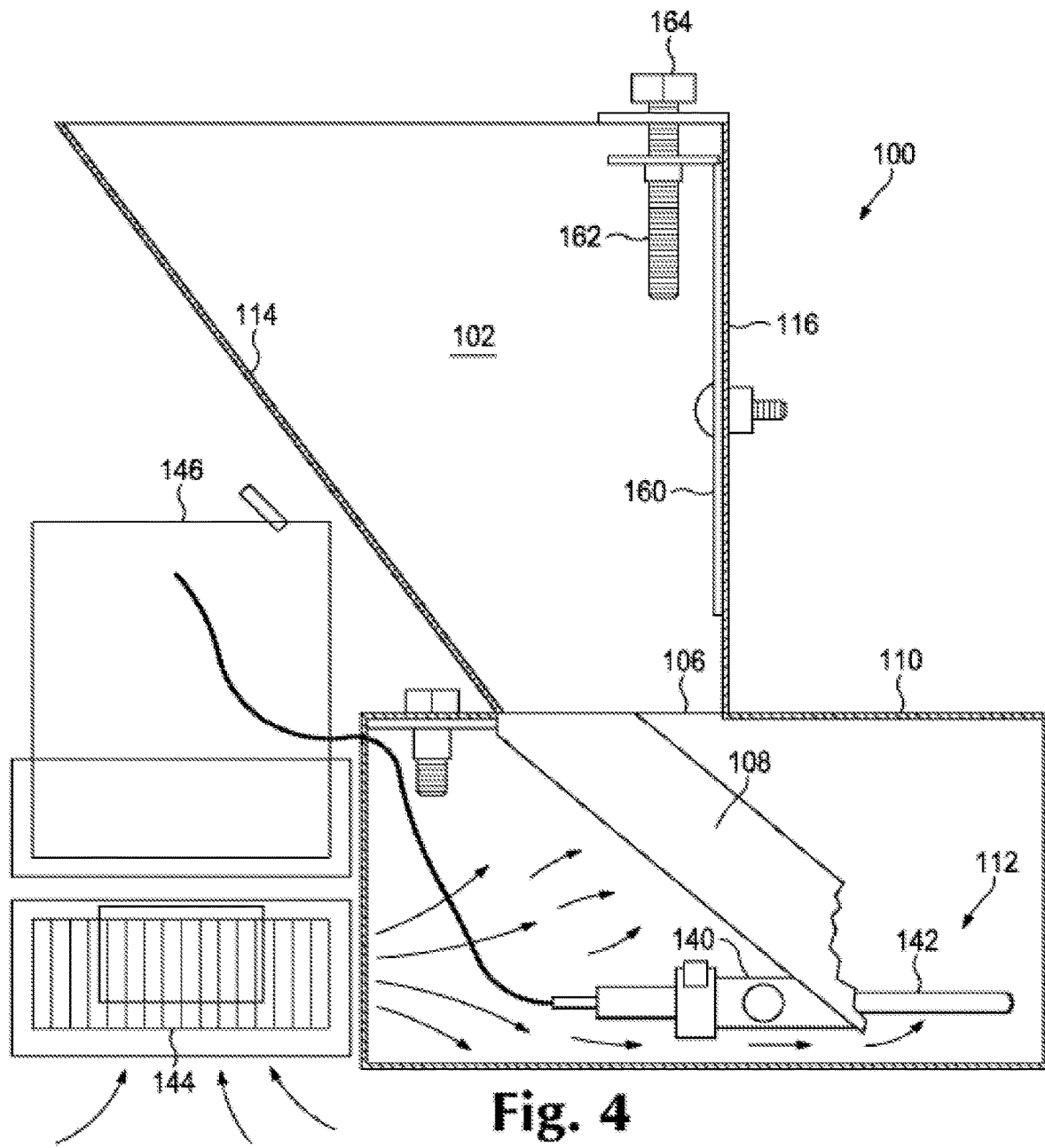

With the barbecue operating, food to be cooked may be placed on the grill. The blower produces forced-air circulation within the interior of the barbecue pan with heated air coming from the fire pot moving upwardly and around the baffle plate and thence circulating against and through the grill. Cooking may be performed with the cover in the closed position or with the cover open. With the cover closed, oven-like conditions are produced within the barbecue, and with the cover open, grill-like conditions are produced. The baffle plate on being heated radiates heat upwardly. Drippings from any food cooked are prevented from falling into the fire pot by the baffle plate which collects such material. With cooking concluded, the auger is stopped which stops feed of pellet material to the fire pot. With stoppage of pellet feed and with the blower turned off, combustion in the pot soon terminates. FIGS. 2-4 illustrate a DC wood pellet burner assembly 100 operable, for example, as a general substitute for or alternative to burner assembly 32 described with reference to prior art pellet-burning barbecue 8 of FIG. 1.

Figure 8:
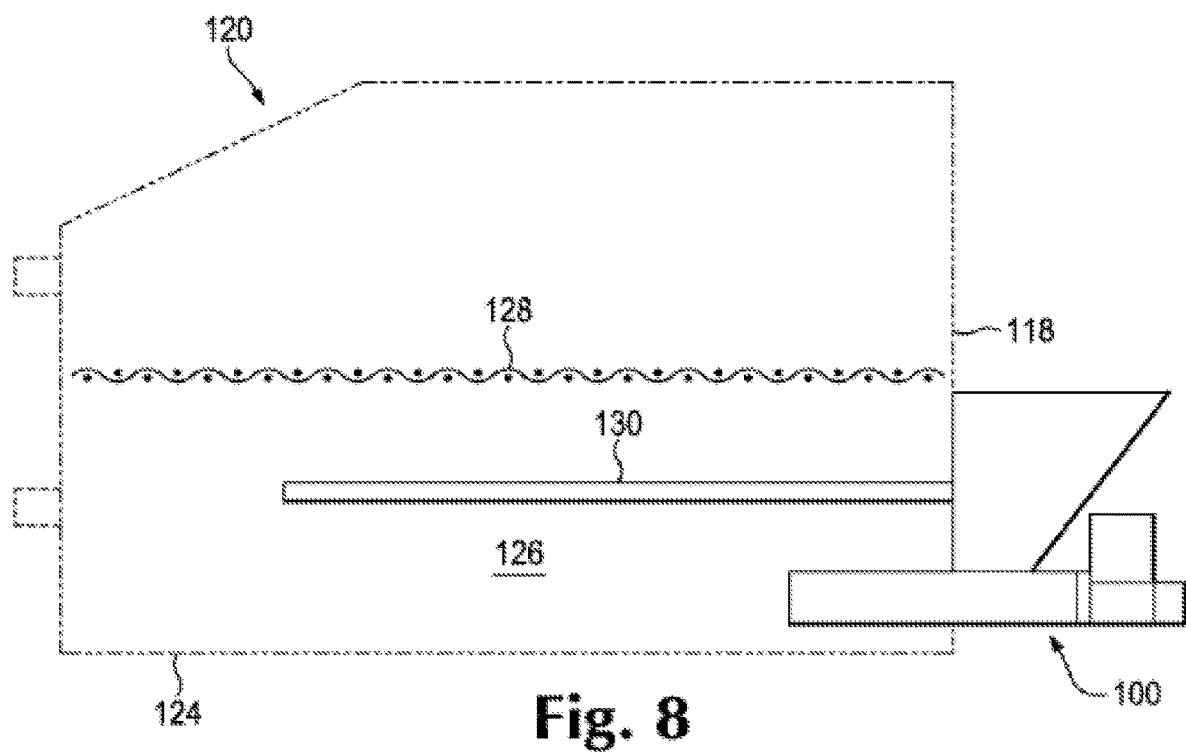
FIG. 8 illustrates a side elevation of a barbecue with the pellet burner assembly of FIG. 2.

Pellet burner assembly 100 includes a pellet hopper 102 that receives and stores a supply of fuel (e.g., wood) pellets 104 (illustrated figuratively in FIG. 3—as is known in the art, pellets 104 are significantly smaller than illustrated) and feeds them through a pellet intake 106 and onto a perforated slide 108 in a burn tube 110 to be fed toward a combustion region 112. In the illustrated implementation, hopper 102 includes at least one inclined face 114 to provide gravity feed of pellets 104 into intake 106. Pellet burner assembly 100 includes a face 116 for mounting to a side 118 of a barbecue, such as a barbecue 120 (FIG. 8).

Barbecue 120 is shown without support legs, as it would be configured in one portable configuration for use on a tabletop or other like surface, for example. It will be appreciated, however, that barbecue could alternatively be mounted on legs or a cart, for example.

In the illustrated implementation, face 116 is contiguous with hopper 102. It will be appreciated, however, that the mounting structure for securing pellet burner assembly 100 to barbecue could alternatively be distinct from hopper 102. Also, face 116 is illustrated as being substantially vertical to conform to a corresponding side 118 of barbecue 120 so that pellet burner assembly 100 may be secured to barbecue 120 by a pair of nuts and bolts 121 (one shown), or more, that extend through corresponding apertures (not shown) in the side 122 of barbecue 120.

Barbecue 120 includes a pan 124 with an interior volume 126 over which a grill 128, or other food-supporting structure (e.g., grate, nonperforate surface, etc.) extends to support food to be cooked such as by hot smoking or other indirect heat cooking. Side 118 includes an aperture (not shown) sized to receive burn tube 110 in a fitted relationship to that burn tube 110 extends into and combustion region 112 is positioned within the interior volume 126 of pan 124. A baffle pan or plate 130, substantially similar in operation to baffle pan or plate 90 (FIG. 1), extends partially across pan 122 in spaced relation above burn tube 110 and below grill 128.

Figure 5:
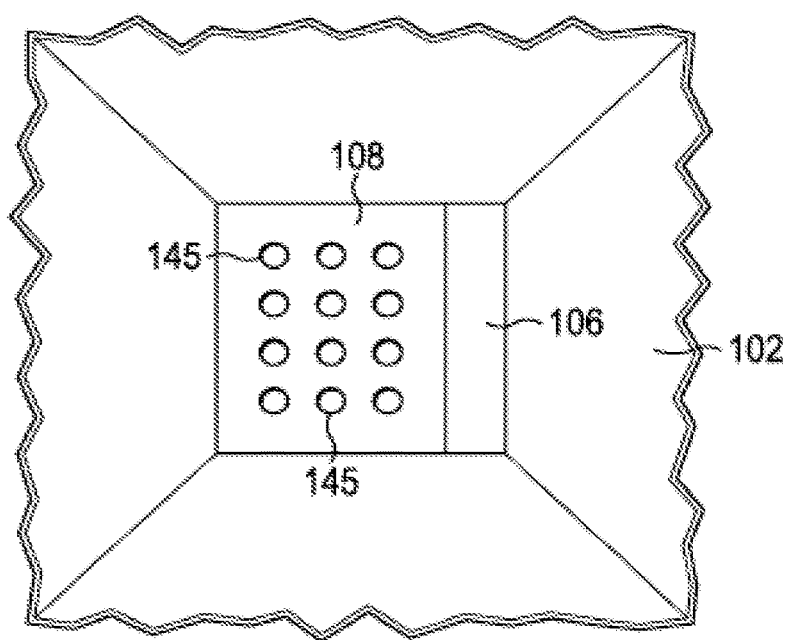
FIG. 5 illustrates a plan view into a hopper of the pellet burner assembly of FIG. 2.
Figure 6:
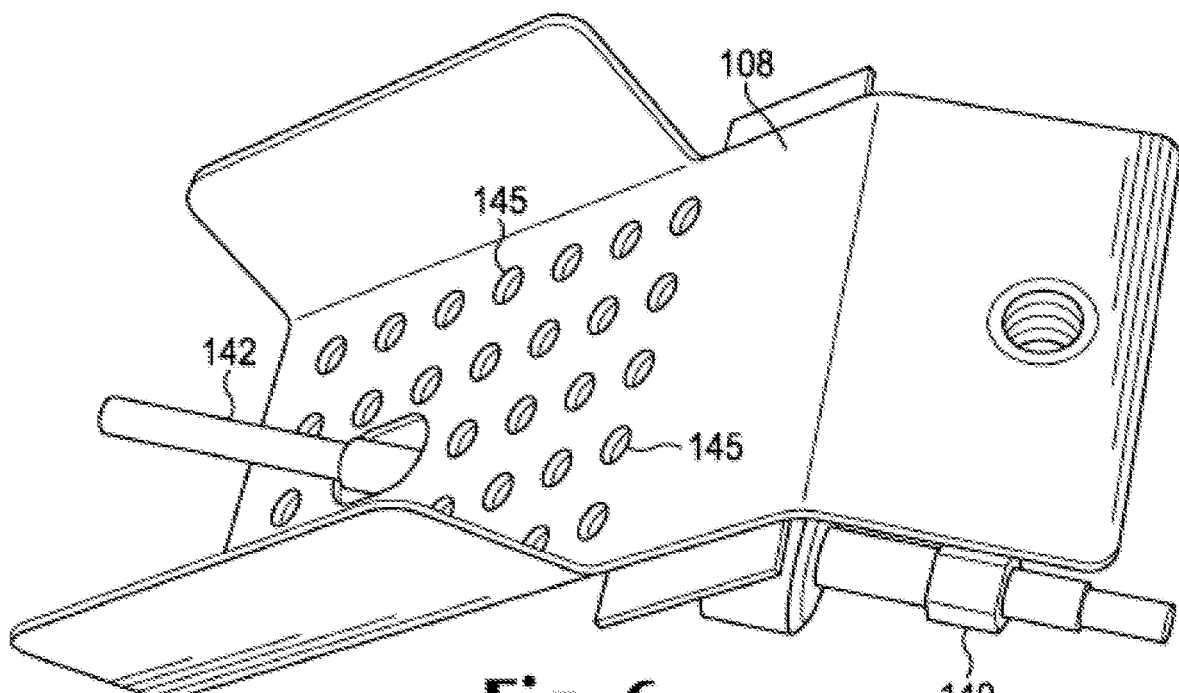
FIGS. 6 and 7 are top and bottom views of a perforated slide of the pellet burner assembly of FIG. 2.
Figure 7:
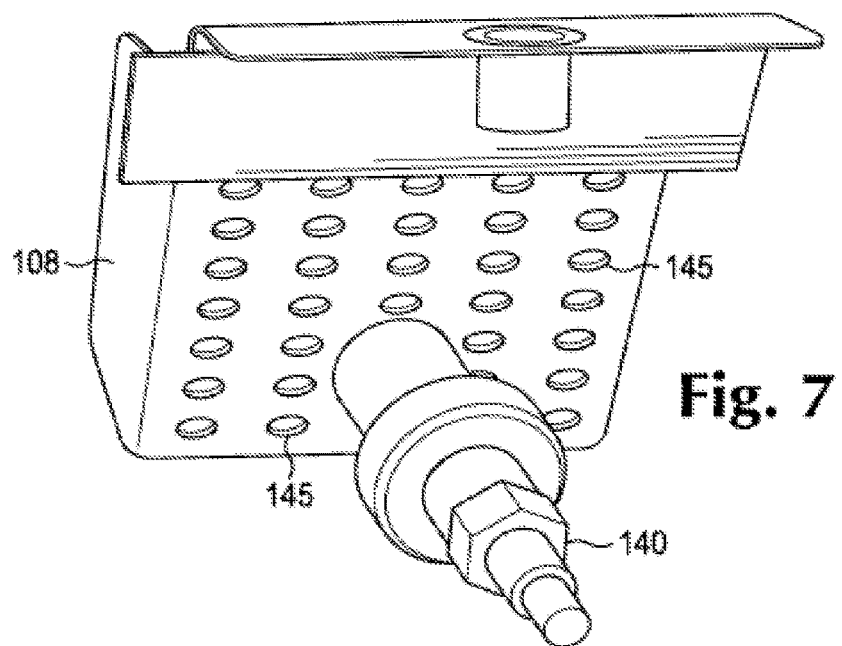

Pellet burner assembly 100 further includes a DC ignitor 140, such as a glow plug, having a heating element 142 that extends into combustion region 112 to ignite pellets 104, a DC fan 144 is positioned to direct a flow of air through perforations 145 (FIGS. 5-7) of perforated slide 108 to combustion region 112, and a DC power source 146, such as a vehicle-grade 12-volt battery.

Figure 9:
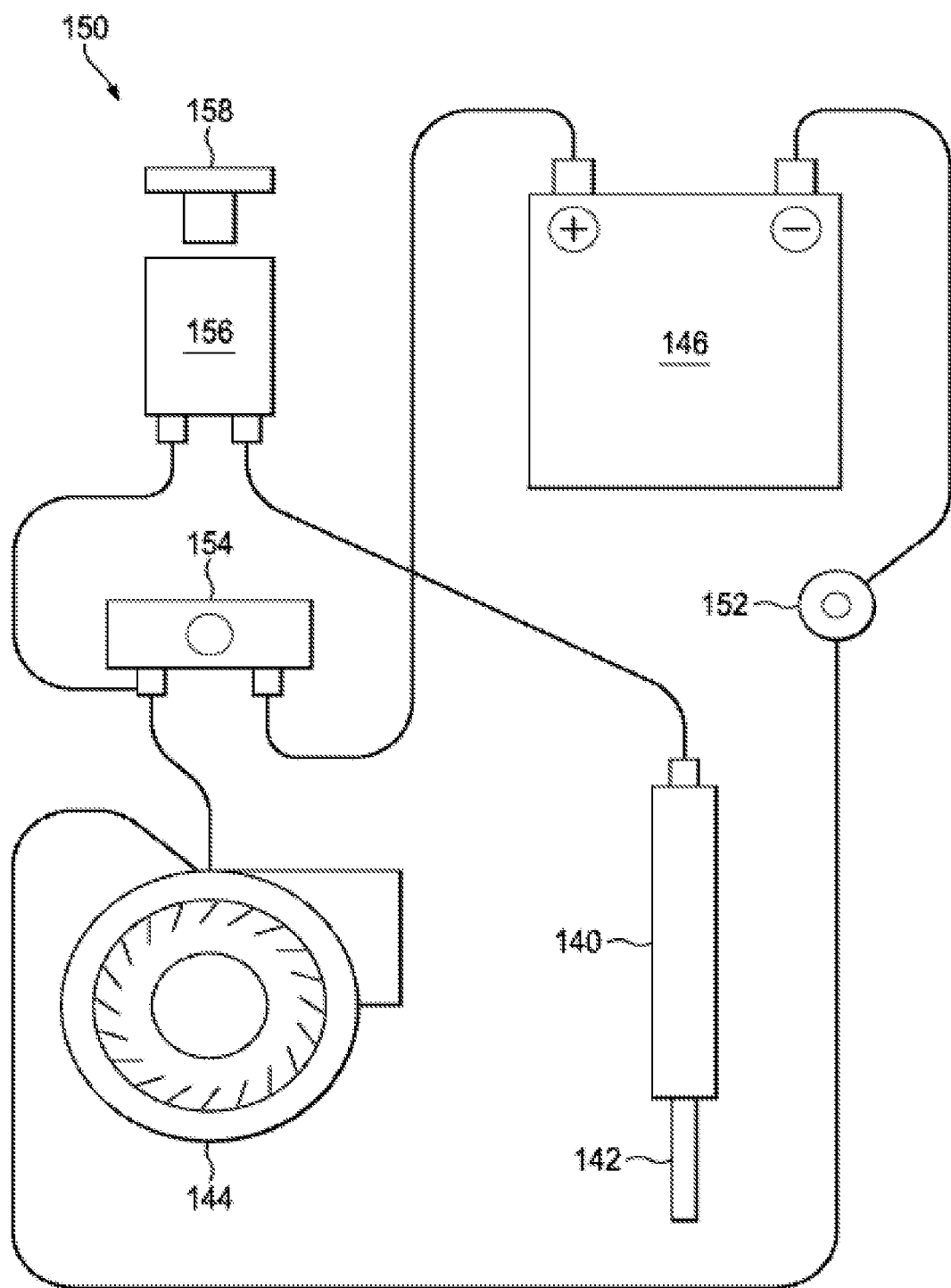
FIG. 9 illustrates a circuit schematic diagram of the pellet burner assembly in accordance with some embodiments.

FIG. 9 is a schematic circuit diagram illustrating electrical system 150 of pellet burner assembly 100. Battery 146 is connected between a body grounding lug 152 and a user-operable power switch 154 that turns electrical system on or off. When on, power switch 154 provides power to fan 144 and to an ignitor activating switch 156, such as a normally open switch that is operable with a push-button 158 and is connected to ignitor 140. Upon a user switching power switch 154 to on, fan 144 is activated and power is delivered to ignitor activating switch 154. A user may then press push-button 158 for a period of time (e.g., approximately 2 minutes) to activate ignitor 140 until pellets 104 in combustion region 112 are ignited. The user may then release push-button 158, deactivating ignitor 140.

Once ignited, the air flow provided by fan 144 allow pellets 104 in combustion region 112 continue to burn and to be replenished automatically as additional pellets 104 drop through intake 106. Pellet burner assembly 100 includes a pellet feed control door 160 that is slidable along one face (e.g., face 116) to control the rate of flow of pellets 104 into combustion region 112, thereby controlling the cooking temperature of barbecue 120. In addition, feed control door 160 functions to close intake 106 so that burning of pellets 104 can be stopped by stopping the flow of pellets 104 into combustion region 112. In the implementation illustrated in FIGS. 3 and 4, feed control door 160 is in threaded engagement with a positioning screw 162 that a user can turn by way of a knob 164 to slide door 160 up or down.

As a result, such a wood pellet burner assembly allows a wood pellet-burning barbecue to be used where AC power is not available, such as at parks, sporting events, some camping areas, etc., and can significantly enhance the portability of wood pellet-burning barbecues.

In one implementation, a pellet burner assembly according to the present invention includes a gravity-feed pellet fuel hopper positioned in alignment with a pellet fuel intake and a perforated pellet fuel slide that extends to a combustion region. A DC ignitor has a heating element that extends into the combustion region, and a DC fan is positioned to direct a flow of air through the perforated pellet fuel slide and into the combustion region. A DC power source, such as a vehicle-grade 12-volt battery, is coupled to and powers the DC ignitor and the DC fan. Such a wood pellet burner assembly allows a wood pellet-burning barbecue to be used where AC power is not available, such as at parks, sporting events, some camping areas, etc., and can significantly enhance the portability of wood pellet-burning barbecues.

Figure 10:
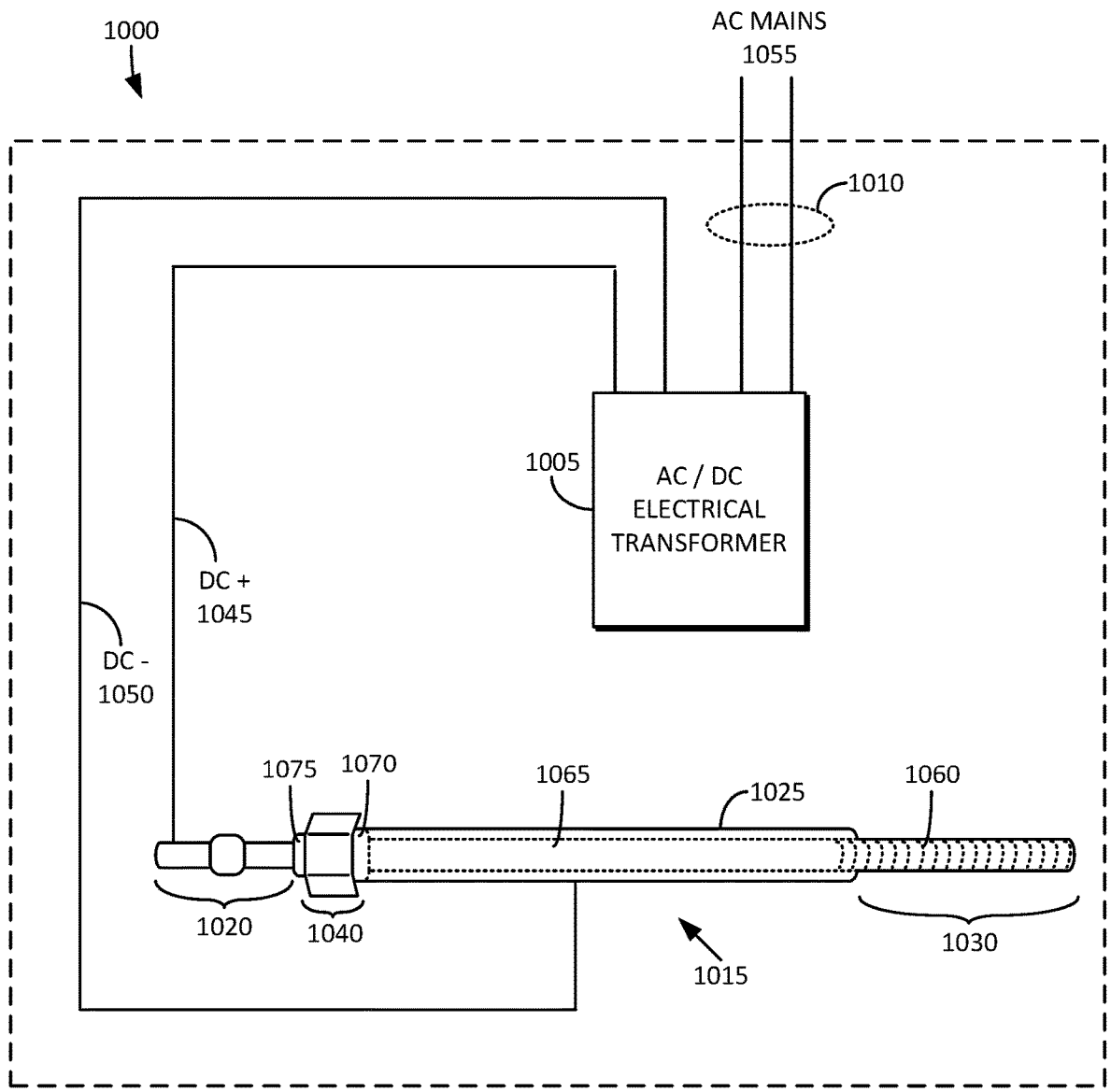
FIG. 10 illustrates another circuit schematic diagram of the pellet burner assembly in accordance with various embodiments of the present inventive concept.

FIG. 10 illustrates another circuit schematic diagram of a wood pellet burner assembly 1000 in accordance with various embodiments of the present inventive concept. The wood pellet burner assembly 1000 can include an alternating current (AC) to direct current (DC) electrical transformer

1005. The AC to DC electrical transformer 1005 can receive AC mains power 1055 via lines 1010. The AC to DC electrical transformer 1005 can output a DC+ voltage potential on line 1045 and a DC− voltage potential on line 1050.

A double-sealed high-temperature resistant direct current (DC) ignitor 1015 is provided for use with the wood pellet burner assembly 1000. The DC ignitor 1015 can include a non-heating element portion 1020. The non-heating element portion 1020 can be connected to a battery (e.g., 146 of FIG. 9) or to the AC to DC electrical transformer 1005. The AC to DC transformer 1005 can be attached to the wood pellet burner assembly 1000. The ignitor 1015 can include a heating element 1030 connected to the non-heating element portion by way of a heating rod 1065. The heating element 1030 can include a resistive heating coil 1060. The heating element 1030 can extend by at least one inch into a combustion region of the wood pellet burner assembly 1000, thereby providing more surface area to contact wood pellets disposed in a combustion region of the wood pellet burner assembly 1000, as further described below. The heating element portion 1030 can be heated by power received from the battery (e.g., 146 of FIG. 9) or the AC to DC electrical transformer 1005. The DC ignitor can include a nut 1040 or other suitable transition section between the heating rod 1065 and the non-heating element portion 1020.

The double-sealed high-temperature resistant DC ignitor 1015 can include an ignitor housing 1025. The ignitor housing 1025 can contain the heating element 1030, the heating rod 1065, and the non-heating element portion 1020. The heating element 1030 can include a heating coil 1060 disposed in the heating element 1030 within the ignitor housing 1025, which when powered, heats up the heating element 1030, including the ignitor housing 1025 proximate to the heating element 1030. The heating rod 1065 can be disposed within the ignitor housing 1025 and connected to the heating coil 1060 in the heating element 1030. The DC ignitor 1015 can include a first seal 1070 disposed within the ignitor housing 1025 at a terminal end of the heating rod 1065. The DC ignitor 1015 can include a second seal 1075 disposed within the ignitor housing 1025 at a terminal end of the non-heating element portion 1020.

In some embodiments, the ignitor housing 1025 is at least partially comprised of a ceramic. In some embodiments, the ignitor housing 1025 is entirely comprised of the ceramic. In some embodiments, the ceramic can be a high-temperature resistant ceramic. In some embodiments, the outer housing 1205 is at least partially comprised of a ceramic. In some embodiments, the outer housing 1205 is entirely comprised of the ceramic. In some embodiments, the ceramic can be a high-temperature resistant ceramic. For example, the ceramic can include at least one of Hafnium carbide (HfC), Tantalum carbide (TaC), Niobium carbide (NbC), Zirconium carbide (ZrC), Hafnium nitride (HfN), Hafnium boride (HfB2), Zirconium boride (ZrB2), Titanium boride (TiB2), Titanium carbide (TiC), Niobium boride (NbB2), Tantalum boride (TaB2), Titanium nitride (TiN), Zirconium nitride (ZrN), Silicon carbide (SiC), Vanadium carbide (VC), Tantalum nitride (TaN), or Niobium nitride (NbN).

In some embodiments, the ignitor housing 1025 is at least partially comprised of a superalloy including at least nickel and chromium. In some embodiments, the ignitor housing 1025 is entirely comprised of the superalloy including at least nickel and chromium. In some embodiments, the ignitor housing 1025 is at least partially comprised of a superalloy such as Inconel®. In some embodiments, the ignitor housing 1025 is at least partially comprised of a superalloy such as Inconel® 600, Inconel® 617, Inconel® 625, Inconel® 690, Inconel® 718, and/or Inconel® X-750. In some embodiments, the ignitor housing 1025 is entirely comprised of the superalloy such as Inconel®. In some embodiments, the ignitor housing 1025 is entirely comprised of the superalloy such as Inconel® 600, Inconel® 617, Inconel® 625, Inconel® 690, Inconel® 718, and/or Inconel® X-750.

In some embodiments, the first seal 1070 and the second seal 1075 are each comprised of a fluoroelastomer such as Viton®. In some embodiments, the first seal 1070 and/or the second seal 1075 are comprised of copolymer having at least one of ethylene, tetrafluoroethylene (TFE), or perfluoromethylvinyl ether (PMVE). The double seals prevent moisture and other contaminants such as acid from the wood pellet fuel from entering and corroding the heating coil 1060 and other internal elements of the DC ignitor 1015. In comparison to conventional ignitors, which problematically cause GFIs to often trip due to moisture and other contaminants seeping into the ignitor, the double-sealed high-temperature resistant DC ignitor 1015 provides an extremely reliable ignitor function that can withstand the harsh conditions of a wood pellet burning unit in outside environments without tripping GFIs. Moreover, the useful life span of the DC ignitor disclosed herein significantly exceeds that of conventional wood pellet burner ignitors.

In some embodiments, the non-heating element portion 1020 is connected to a positive terminal of the battery (e.g., 146 of FIG. 9) or to a positive terminal of the AC to DC electrical transformer 1005. In some embodiments, the ignitor housing 1025 is connected to a negative terminal of the battery (e.g., 146 of FIG. 9) or to a negative terminal of the AC to DC electrical transformer 1005. In some embodiments, a negative terminal of the battery (e.g., 146 of FIG. 9) or the negative terminal of the AC to DC electrical transformer 1005 is connected to a grounding lug (e.g., 152 of FIG. 9) that is directly connected to the wood pellet burner assembly 1000.

Figure 11:
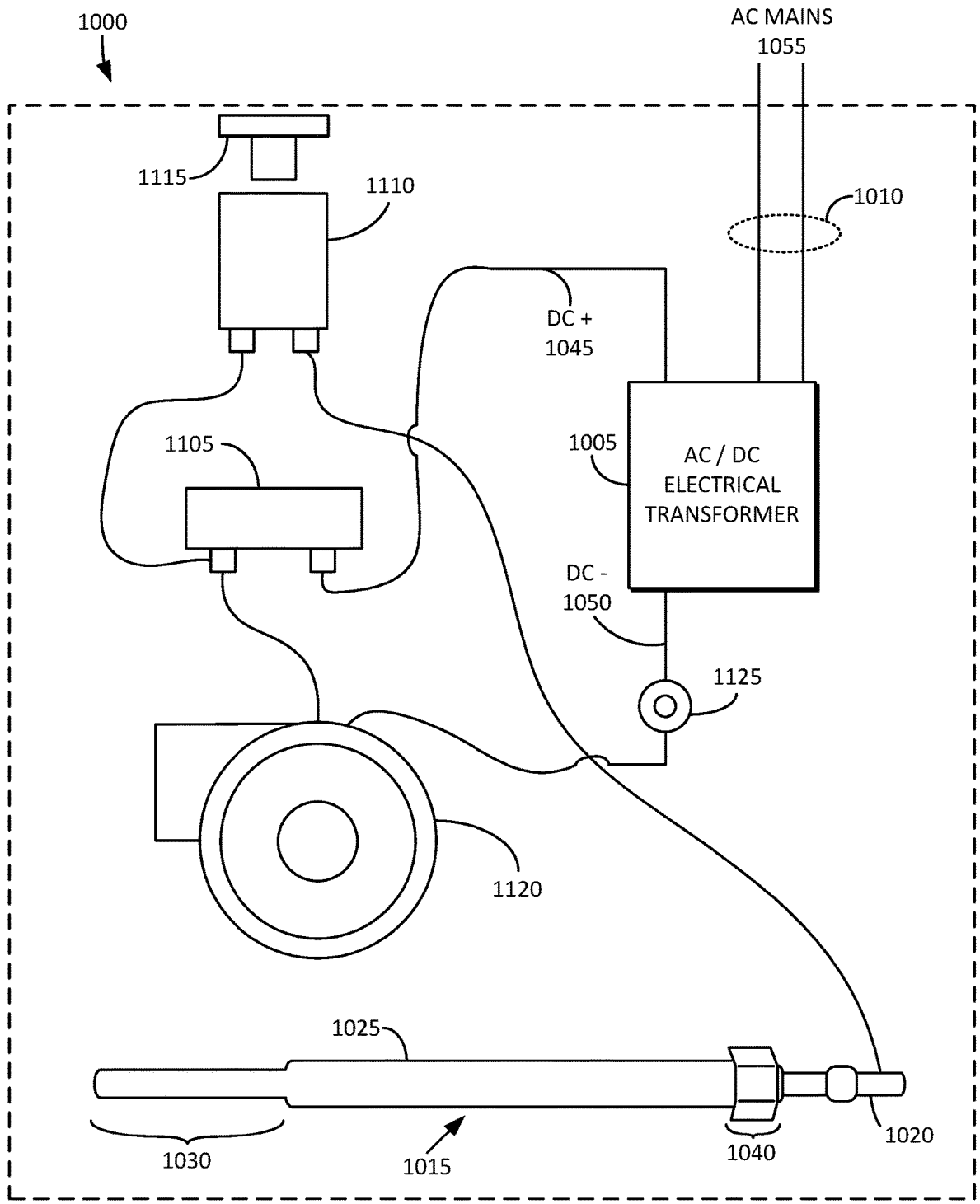
FIG. 11 illustrates yet another circuit schematic diagram of the pellet burner assembly in accordance with various embodiments of the present inventive concept.

FIG. 11 illustrates yet another circuit schematic diagram of a pellet burner assembly 1000 in accordance with various embodiments of the present inventive concept. Some elements have the same reference numerals as described in embodiments above, and therefore, a detail description of such elements is not necessarily repeated.

The AC to DC electrical transformer 1005 can be connected between a body grounding lug 1125 and a user-operable power switch 1105 that turns the electrical system on or off. The non-heating element portion 1020 can be connected to the AC to DC electrical transformer 1005 via the user-operable ignitor switch 1110 and via the user-operable power switch 1105. When on, the power switch 1105 can provide power to a fan 1120 and to an ignitor activating switch 1110, such as a normally open switch that is operable with a push-button 1115, and is connected to the DC ignitor 1015. When turned on, the user-operable power switch 1105 can provide power from the AC to DC electrical transformer 1005 to the user-operable ignitor switch 1110 and the heating element 1030 via the user-operable power switch 1105. Upon a user switching power switch 1105 to on, the fan 1120 is activated and power can be delivered to the ignitor activating switch 1110. A user may then press push-button 1115 for a period of time (e.g., approximately 30 seconds) to activate the DC ignitor 1015 until pellets (e.g., 104 of FIG. 3) in the combustion region (e.g., 112 of FIG. 3) are ignited. The user may then release push-button 1115, deactivating the DC ignitor 1015. The heating element 1030 can receive power from the AC to DC electrical transformer 1005 responsive to a press of the push-button 1115 that is connected to the user-operable ignitor switch 1110.

Once ignited, the air flow provided by the fan 1120 allow the pellets 104 in the combustion region 112 continue to burn and to be replenished automatically as additional pellets 104 drop through the intake (e.g., 106 of FIG. 3).

Figure 12:
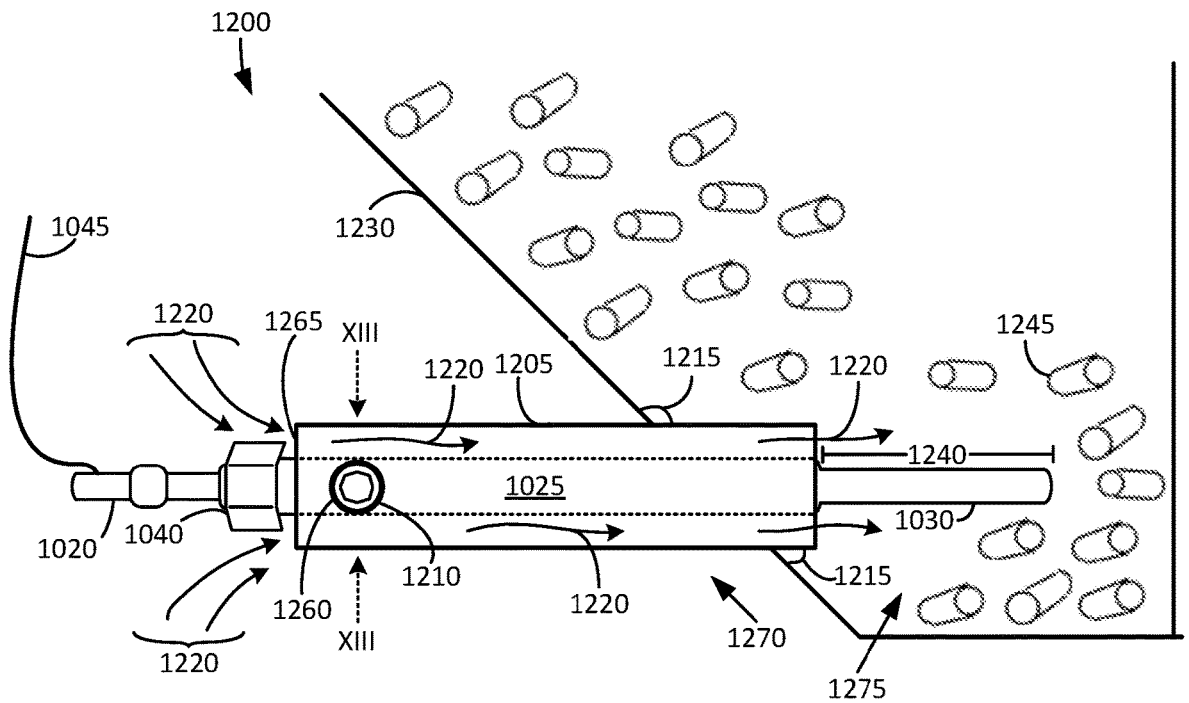
FIG. 12 illustrates side elevation of an implementation of a pellet burner assembly including a double-sealed high-temperature resistant DC ignitor in accordance with various embodiments of the present inventive concept.
Figure 13:
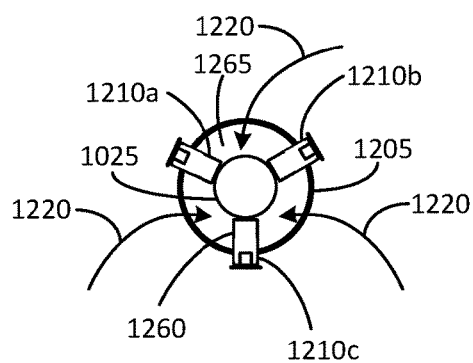
FIG. 13 illustrates a plan view of a section of the DC ignitor of FIG. 12 taken along lines XIII-XIII.

FIG. 12 illustrates side elevation of an implementation of a pellet burner assembly 1200 including a double-sealed high-temperature resistant DC ignitor 1270 in accordance with various embodiments of the present inventive concept. FIG. 13 illustrates a plan view of a section of the DC ignitor 1270 of FIG. 12 taken along lines XIII-XIII Reference is now made to FIGS. 12 and 13. Some elements have the same reference numerals as described in embodiments above, and therefore, a detail description of such elements is not necessarily repeated.

In some embodiments, the heating element 1030 extends through a pellet fuel slide 1230 of the wood pellet burner assembly 1200. The DC ignitor 1270 can include a tubular outer housing 1205 surrounding a mid section of the ignitor housing 1025. A plurality of threads 1260 can be disposed in the tubular outer housing 1205. A plurality of set screws 1210 can be disposed in the corresponding plurality of threads 1260. The set screws 1210 can hold the ignitor housing 1025 within the tubular outer housing 1205 without the ignitor housing 1025 directly touching inner walls of the tubular outer housing 1205. In some embodiments, an annular combustion air intake opening 1265 can be disposed at a terminal end of the tubular outer housing 1205. The annular combustion air intake opening 1265 can receive combustion air 1220 from outside the tubular outer housing 1205. The tubular outer housing 1205 can guide the combustion air 1220 over the ignitor housing 1025 to cool the ignitor housing 1025. The tubular outer housing 1205 can guide the combustion air 1220 toward the heating element 1030 to assist in combusting wood pellets 1245 disposed in the combustion region 1275 of the pellet burner assembly 1200.

In some embodiments, the plurality of set screws 1210 includes a first set screw 1210a, a second set screw 1210b, and a third set screw 1210c. The first set screw 1210a can extend radially from the ignitor housing 1025 in a first direction. The second set screw 1210b can extend radially from the ignitor housing 1025 in a second direction that is 120 degrees offset relative to the first set screw 1210a. The third set screw 1210c can extend radially from the ignitor housing 1025 in a third direction that is 120 degrees offset relative to the second set screw 1210b. The tubular outer housing 1205 can be connected to the pellet fuel slide 1230 such that the ignitor housing 1025 does not directly touch the pellet fuel slide 1230. For example, the tubular outer housing 1205 can be welded to the pellet fuel slide 1230 with weld material 1215. The DC ignitor 1270 can extend into a central base area of the combustion region 1275 of the wood pellet burner assembly 1200. More specifically, the heating element 1030 of the DC ignitor 1270 can extend by at least one inch, as shown at 1240, into the combustion region 1275, thereby exposing a greater surface area to contact with the wood pellets 1245, and thereby speeding the initiation of combustion of the wood pellets 1245.

Figure 14:
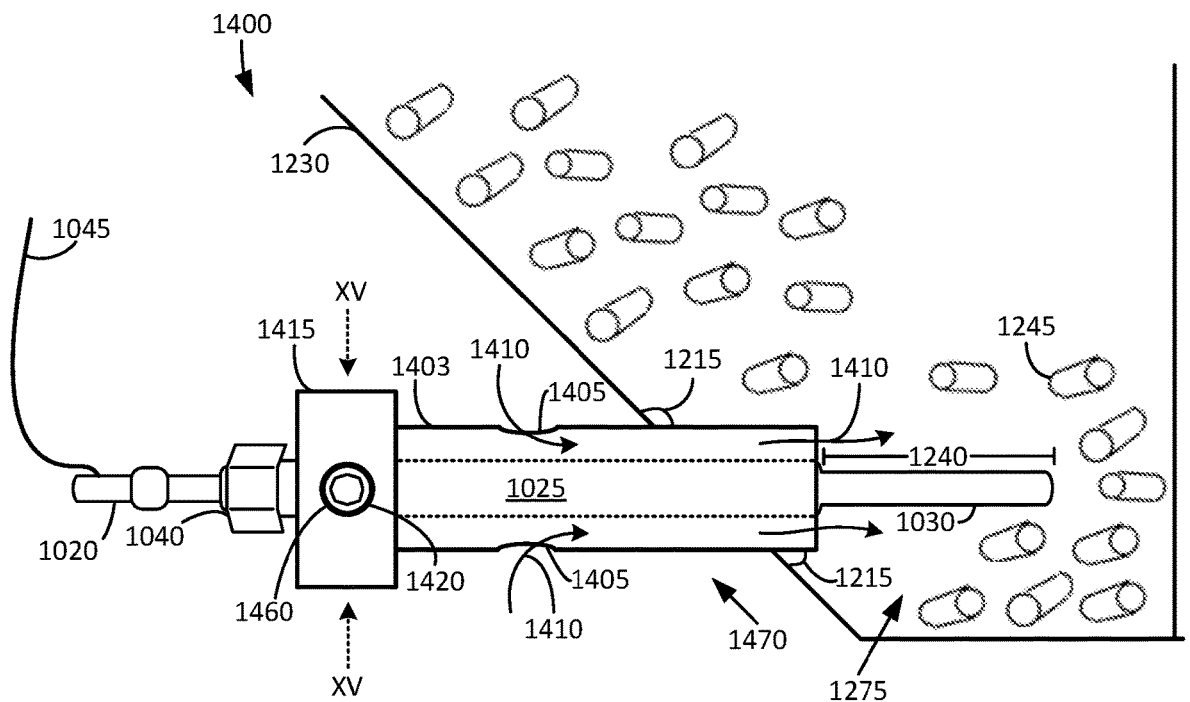
FIG. 14 illustrates side elevation of another implementation of a pellet burner assembly including another double-sealed high-temperature resistant DC ignitor in accordance with various embodiments of the present inventive concept.
Figure 15:
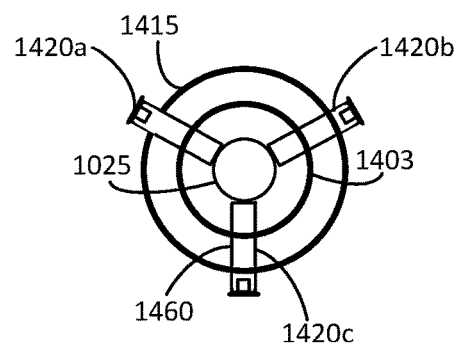
FIG. 15 illustrates a plan view of a section of the DC ignitor of FIG. 14 taken along lines XV-XV.

FIG. 14 illustrates side elevation of another implementation of a pellet burner assembly 1400 including another double-sealed high-temperature resistant DC ignitor 1470 in accordance with various embodiments of the present inventive concept. FIG. 15 illustrates a plan view of a section of the DC ignitor 1470 of FIG. 14 taken along lines XV-XV. Reference is now made to FIGS. 14 and 15. Some elements have the same reference numerals as described in embodiments above, and therefore, a detail description of such elements is not necessarily repeated.

In some embodiments, the heating element 1030 extends through a pellet fuel slide 1230 of the wood pellet burner assembly 1400. The DC ignitor 1470 can include a tubular outer housing 1403 surrounding a mid section of the ignitor housing 1025. An ignitor holding flange 1415 can be connected to the tubular outer housing 1403. A plurality of threads 1460 can be disposed in the tubular outer housing 1403. The plurality of threads 1460 can extend into the ignitor holding flange 1415. A plurality of set screws 1420 can be disposed in the corresponding plurality of threads 1460. The ignitor holding flange 1415 can receive the plurality of set screws 1420. The set screws 1420 can hold the ignitor housing 1025 within the tubular outer housing 1403 without the ignitor housing 1025 directly touching inner walls of the tubular outer housing 1403. In some embodiments, a plurality of combustion air intake openings 1405 can be disposed in the tubular outer housing 1403. The combustion air intake openings 1405 can receive combustion air 1410 from outside the tubular outer housing 1403. The tubular outer housing 1403 can guide the combustion air 1410 over the ignitor housing 1025 to cool the ignitor housing 1025. The tubular outer housing 1403 can guide the combustion air 1410 toward the heating element 1030 to assist in combusting wood pellets 1245 disposed in the combustion region 1275 of the pellet burner assembly 1400.

In some embodiments, the plurality of set screws 1420 includes a first set screw 1420a, a second set screw 1420b, and a third set screw 1420c. The first set screw 1420a can extend radially from the ignitor housing 1025 in a first direction. The second set screw 1420b can extend radially from the ignitor housing 1025 in a second direction that is 120 degrees offset relative to the first set screw 1420a. The third set screw 1420c can extend radially from the ignitor housing 1025 in a third direction that is 120 degrees offset relative to the second set screw 1420b. The tubular outer housing 1403 can be connected to the pellet fuel slide 1230 such that the ignitor housing 1025 does not directly touch the pellet fuel slide 1230. For example, the tubular outer housing 1403 can be welded to the pellet fuel slide 1230 with weld material 1215. The DC ignitor 1470 can extend into a central base area of the combustion region 1275 of the wood pellet burner assembly 1400. More specifically, the heating element 1030 of the DC ignitor 1470 can extend by at least one inch, as shown at 1240, into the combustion region 1275, thereby exposing a greater surface area to contact with the wood pellets 1245, and thereby speeding the initiation of combustion of the wood pellets 1245.

Figures 16, 17:
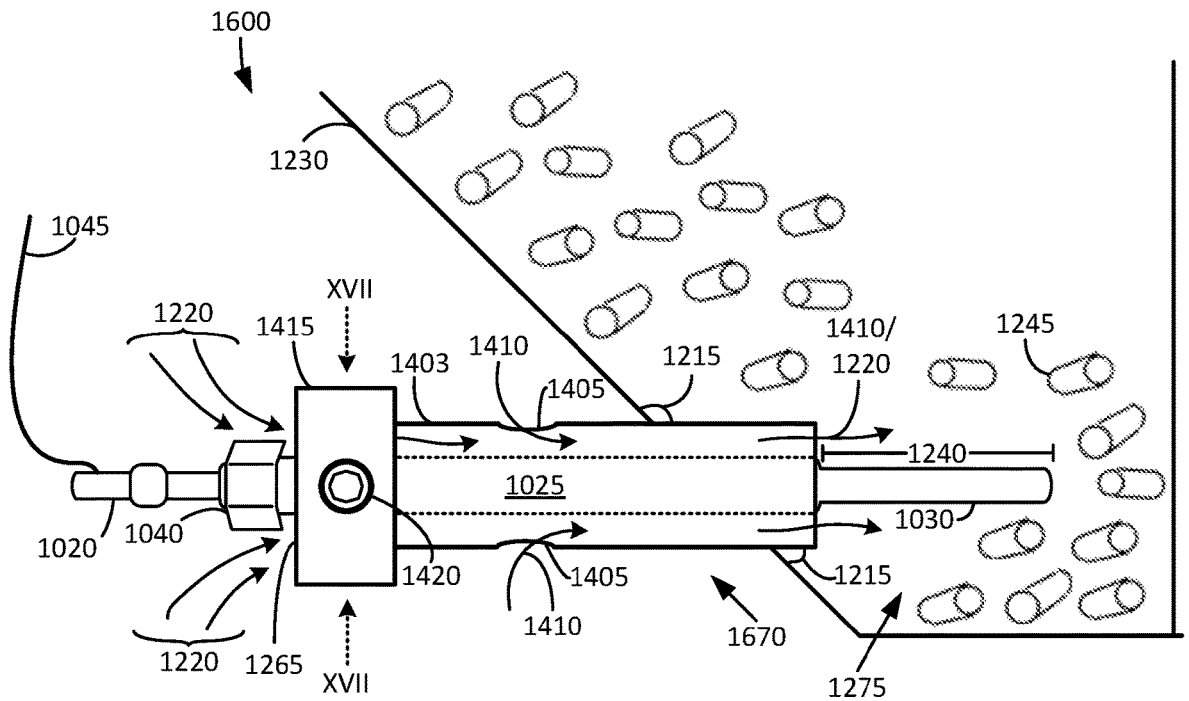
FIG. 16 illustrates side elevation of yet another implementation of a pellet burner assembly including yet another double-sealed high-temperature resistant DC ignitor in accordance with various embodiments of the present inventive concept.
FIG. 17 illustrates a plan view of a section of the DC ignitor of FIG. 16 taken along lines XVII-XVII.

FIG. 16 illustrates side elevation of yet another implementation of a pellet burner assembly 1600 including yet another double-sealed high-temperature resistant DC ignitor 1670 in accordance with various embodiments of the present inventive concept. FIG. 17 illustrates a plan view of a section of the DC ignitor 1670 of FIG. 16 taken along lines XVII-XVII. Reference is now made to FIGS. 16 and 17. Some elements have the same reference numerals as described in embodiments above, and therefore, a detail description of such elements is not necessarily repeated.

The DC ignitor 1670 of the pellet burner assembly 1600 incorporates features of both of the DC ignitor 1270 of FIG. 12 and the DC ignitor 1470 of FIG. 14. For example, the DC ignitor 1670 includes the plurality of combustion air intake openings 1405 and the annular combustion air intake opening 1265. Accordingly, the DC ignitor 1670 can receive the combustion air 1220 and the combustion air 1410, which enhances the flow of the combustion air over the ignitor housing 1025 and toward the heating element 1030 to assist in combusting the wood pellets 1245 disposed in the combustion region 1275 of the pellet burner assembly 1600.

Figure 18:
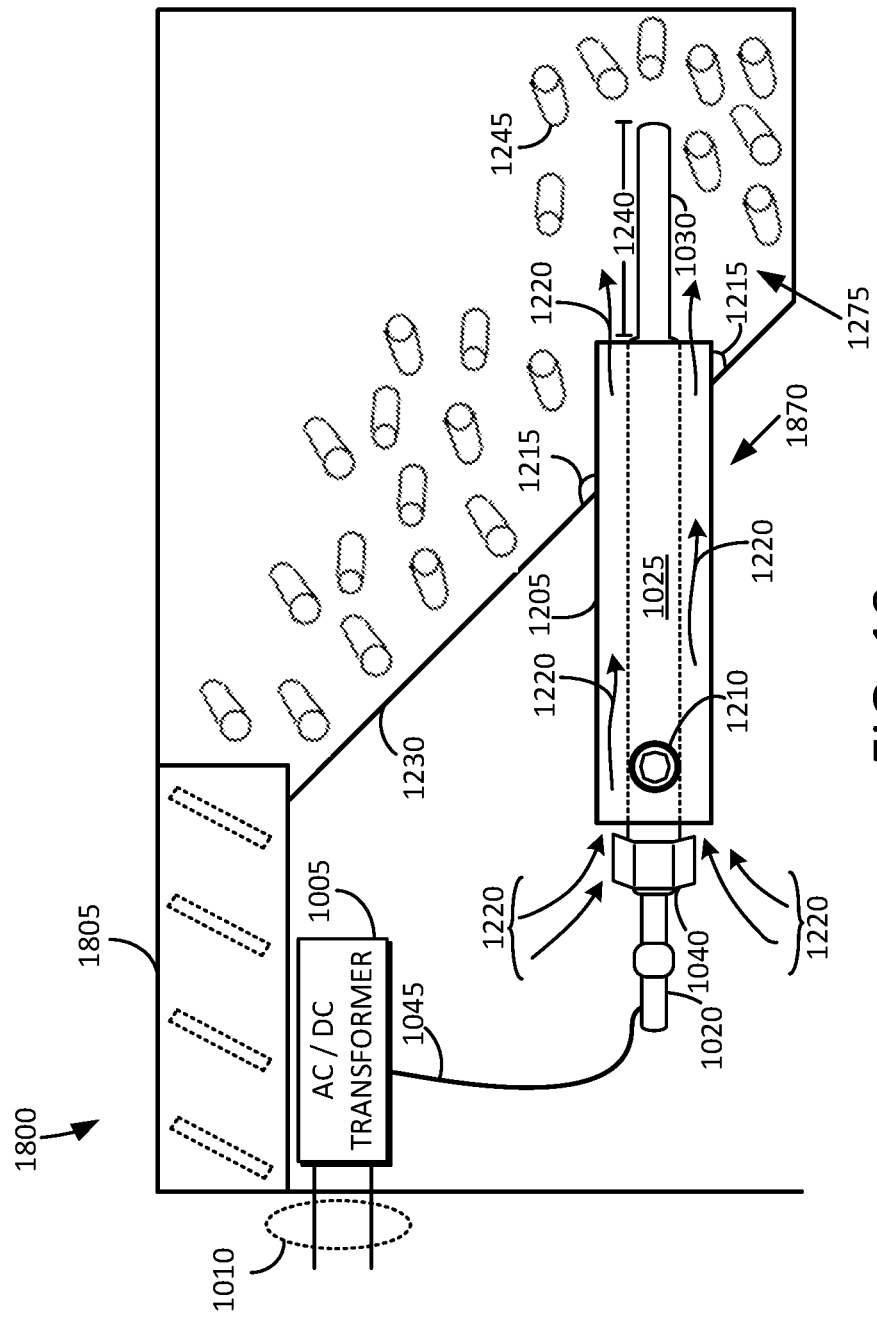
FIG. 18 illustrates side elevation of still another implementation of a pellet burner assembly including a wood pellet auger, and including a double-sealed high-temperature resistant DC ignitor in accordance with various embodiments of the present inventive concept.

FIG. 18 illustrates side elevation of still another implementation of a wood pellet burner assembly 1800 including a wood pellet auger 1805, and including a double-sealed high-temperature resistant DC ignitor 1870 in accordance with various embodiments of the present inventive concept. It will be understood that the DC ignitor 1870 can be any of the DC ignitors described herein. Some elements have the same reference numerals as described in embodiments above, and therefore, a detail description of such elements is not necessarily repeated. The auger 1805 can provide a measured feed of the wood pellets 1245 into the combustion region 1275. The heating element 1030 can initiate combustion of the wood pellets 1245 provided by the auger 1805. The wood pellet burner assembly 1800 can include the AC to DC electrical transformer 1005, which can be connected to the DC ignitor 1870 to provide DC power to the DC ignitor 1870.

Figure 19:
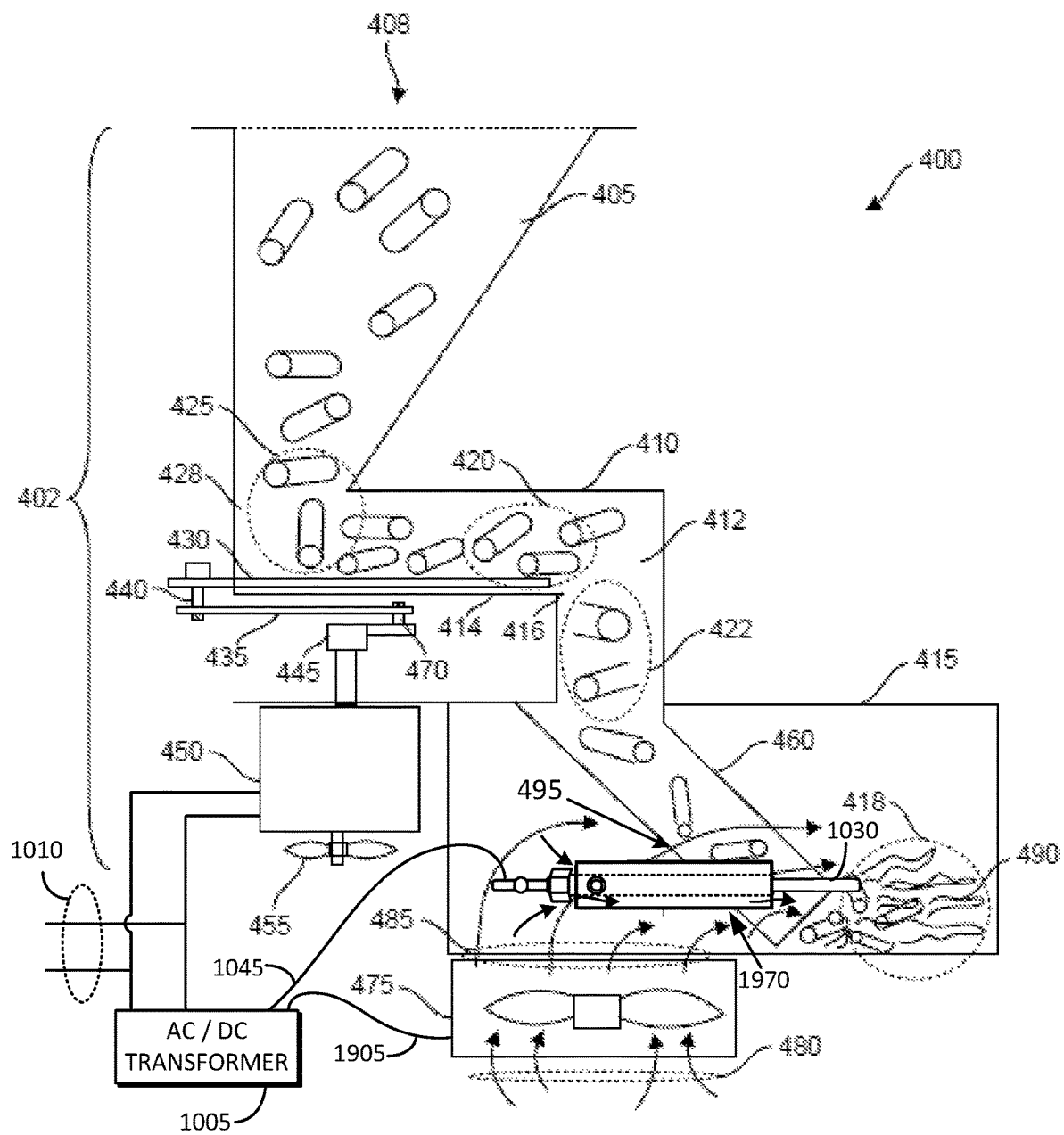
FIG. 19 illustrates side elevation of yet another implementation of a pellet burner assembly including a sliding floor hopper, and including a double-sealed high-temperature resistant DC ignitor in accordance with various embodiments of the present inventive concept.

FIG. 19 illustrates side elevation of yet another implementation of a pellet burner assembly 400 including a sliding floor hopper 402, and including a double-sealed high-temperature resistant DC ignitor 1970 in accordance with various embodiments of the present inventive concept. It will be understood that the DC ignitor 1970 can be any of the DC ignitors described herein. Some elements have the same reference numerals as described in embodiments above, and therefore, a detail description of such elements is not necessarily repeated. The sliding floor hopper 402 can provide a measured feed of wood pellets 422 into the combustion region 490. The heating element 1030 can initiate combustion of the wood pellets 422 provided by the sliding floor hopper 402. The wood pellet burner assembly 400 can include the AC to DC electrical transformer 1005, which can be connected to the DC ignitor 1970 to provide DC power to the DC ignitor 1970.

The sliding floor hopper 402 can include an upper loading section 405 having an opening 408 through which wood pellets (e.g., 425 and 420) can be received. The sliding floor hopper 402 can include a staging section 410 in which the wood pellets can be staged for automatic and periodic feeding on a continuous basis into the burner section 415.

The sliding floor hopper 402 can include a sliding floor 430. The sliding floor 430 can be caused to laterally oscillate in a continuous cycle, which can automatically feed the burner section 415. For example, the sliding floor 430 can be caused to slide from a back position to a forward position, and then can be caused to return to the back position, and so forth. The wood pellets (e.g., 425) can accumulate near a back region 428 of the staging section 410 when the sliding floor 430 is in the back position. Then, when the sliding floor 430 transitions from the back position to the forward position, the pellets 425 near the back region 428 can be pushed forward toward a front region 412 of the staging section 410. Simultaneously, when the sliding floor 430 transitions to the forward position, some of the wood pellets (e.g., 420) can be pushed off of a staging surface 414 of the staging section 410, thereby causing some of the wood pellets (e.g., 422) to be pushed over a staging edge 416, and to tumble onto a fire grate 460 and into burner section 415.

The sliding floor hopper 402 can include motor 450, a cam 445, a connecting shaft 435, a connecting pin 440, and the sliding floor 430. The motor 450 can be a gear motor, for example. The motor 450 can be a low-torque motor such as in the range of 5 to 15 Inch-pounds. For example, the motor 450 can be a 10 Inch-pound low-torque motor. The cam 445 can transform rotary motion of the motor 450 into a substantially linear motion of the connecting shaft 435. In an alternative embodiment, the cam 445 can be coupled directly to the sliding floor 430 such that it directly oscillates the sliding floor 430 in the lateral directions (not shown). The connecting shaft 435 can cause the sliding floor 430 to laterally oscillate by use of the connecting pin 440. The motor 450 can have a fan 455 attached thereto to provide cooling to the motor 450. The fan 455 can be spun by the rotary motion of the motor 450.

Within the burner section 415 of the wood pellet burner unit 400, the fire grate 460 can be at least partially disposed below the staging edge 416 to receive the wood pellets (e.g., 422) as they are pushed off the staging edge 416. The wood pellets 422 can travel down the fire grate 460 and form near a lower region 418 of the fire grate 460 and the burner section 415. The DC igniter 1970 can be disposed near the lower region 418 and can cause the wood pellets 422 that congregate near the lower region 418 to ignite. The DC igniter 1970 can be manually and/or electrically controlled.

A combustion fan 475 can be attached to the burner section 415 of the wood pellet burner unit 400. The combustion fan can provide air 480, including oxygen, to fan and energize the flames 490, and to keep the burner section 415 efficiently burning the wood pellets (e.g., 418). The air 480 can be pushed by the combustion fan 475 through a vent or opening 485 into the burner section 415, through holes 495 in the fire grate 460, and toward the wood pellets (e.g., 418), thereby fanning and energizing the flames 490 so that the wood pellets continue to burn.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A high-temperature resistant direct current (DC) ignitor for use with a wood pellet burner assembly, comprising:
   a non-heating element portion, wherein the non-heating element portion is connected to at least one of a battery or an alternating current (AC) to DC electrical transformer attached to the wood pellet burner assembly;
   a heating element portion connected to the non-heating element portion, and configured to extend into a combustion region of the wood pellet burner assembly, wherein the heating element portion is configured to be heated by power received from the at least one of the battery or the AC to DC electrical transformer;
   an outer housing surrounding a mid section of an ignitor housing;
   a plurality of threads disposed in the outer housing; and
   a plurality of set screws disposed in the corresponding plurality of threads, and configured to hold the ignitor housing within the outer housing without the ignitor housing directly touching inner walls of the outer housing,
   wherein:
   the heating element portion is configured to extend through a pellet fuel slide of the wood pellet burner assembly;
   the DC ignitor is disposed in a substantially horizontal orientation;
   the wood pellet burner assembly includes a DC fan positioned to direct a flow of air in a substantially horizontal direction along the length of the DC ignitor, through perforations in the pellet fuel slide and into the combustion region;
   the AC to DC electrical transformer is configured to power the DC ignitor and the DC fan;
   the wood pellet burner assembly includes a body grounding lug, a user operable power switch, and a user-operable ignitor switch in communication between the AC to DC electrical transformer and the DC ignitor; and
   the user-operable power switch, when turned on, is configured to provide power from the at least one of the battery or the AC to DC electrical transformer to the user-operable ignitor switch and the heating element portion via the user-operable power switch.

2. The high-temperature resistant DC ignitor for use with a wood pellet burner assembly of claim 1, wherein the ignitor housing is at least partially comprised of a ceramic.

3. The high-temperature resistant DC ignitor for use with a wood pellet burner assembly of claim 2, wherein the ceramic includes at least one of Hafnium carbide (HfC), Tantalum carbide (TaC), Niobium carbide (NbC), Zirconium carbide (ZrC), Hafnium nitride (HfN), Hafnium boride (HfB2), Zirconium boride (ZrB2), Titanium boride (TiB2), Titanium carbide (TiC), Niobium boride (NbB2), Tantalum boride (TaB2), Titanium nitride (TiN), Zirconium nitride (ZrN), Silicon carbide (SiC), Vanadium carbide (VC), Tantalum nitride (TaN), or Niobium nitride (NbN).

4. The high-temperature resistant DC ignitor for use with a wood pellet burner assembly of claim 1, wherein the outer housing is at least partially comprised of a ceramic.

5. The high-temperature resistant DC ignitor for use with a wood pellet burner assembly of claim 4, wherein the ceramic includes at least one of Hafnium carbide (HfC), Tantalum carbide (TaC), Niobium carbide (NbC), Zirconium carbide (ZrC), Hafnium nitride (HfN), Hafnium boride (HfB2), Zirconium boride (ZrB2), Titanium boride (TiB2), Titanium carbide (TiC), Niobium boride (NbB2), Tantalum boride (TaB2), Titanium nitride (TiN), Zirconium nitride (ZrN), Silicon carbide (SiC), Vanadium carbide (VC), Tantalum nitride (TaN), or Niobium nitride (NbN).

6. The high-temperature resistant DC ignitor for use with a wood pellet burner assembly of claim 1, wherein the ignitor housing is at least partially comprised of a superalloy.

7. The high-temperature resistant DC ignitor for use with a wood pellet burner assembly of claim 6, wherein the superalloy includes at least one of Inconel® 600, Inconel® 617, Inconel® 625, Inconel® 690, Inconel® 718, or Inconel® X-750.

8. The high-temperature resistant DC ignitor for use with a wood pellet burner assembly of claim 1, wherein:
   the wood pellet burner assembly includes a wood pellet fuel hopper positioned in alignment with a pellet fuel intake and the pellet fuel slide, which extends to the combustion region of the wood pellet burner assembly; and
   the DC ignitor extends into a central base area of the combustion region of the wood pellet burner assembly.

9. The high-temperature resistant DC ignitor for use with a wood pellet burner assembly of claim 1, wherein the user-operable ignitor switch includes a push-button.

10. The high-temperature resistant DC ignitor for use with a wood pellet burner assembly of claim 9, wherein the heating element portion is configured to receive power from the at least one of the battery or the AC to DC electrical transformer responsive to a press of the push-button that is connected to the user-operable ignitor switch.

11. The high-temperature resistant DC ignitor for use with a wood pellet burner assembly of claim 1, wherein the AC to DC electrical transformer is connected between the body grounding lug and the user-operable power switch.

12. The high-temperature resistant DC ignitor for use with a wood pellet burner assembly of claim 1, wherein:
   the user-operable power switch, when turned on, is configured to provide power to the DC fan and to the user-operable ignitor switch; and
   the user-operable ignitor switch is connected to the DC ignitor.

13. The high-temperature resistant DC ignitor for use with a wood pellet burner assembly of claim 1, wherein the non-heating element portion is connected to the at least one of the battery or the AC to DC electrical transformer via the user-operable ignitor switch and via the user-operable power switch.

14. The high-temperature resistant DC ignitor for use with a wood pellet burner assembly of claim 1, further comprising:
   the ignitor housing;
   a heating coil disposed in the heating element portion within the ignitor housing;
   a heating rod disposed within the ignitor housing and connected to the heating coil in the heating element portion;
   a first seal disposed within the ignitor housing at a terminal end of the heating rod; and
   a second seal disposed within the ignitor housing at a terminal end of the non-heating element portion.

15. The high-temperature resistant DC ignitor for use with a wood pellet burner assembly of claim 14, wherein the first and second seals are each comprised of a fluoroelastomer including a copolymer having at least one of ethylene, tetrafluoroethylene (TFE), or perfluoromethylvinyl ether (PMVE).

16. A high-temperature resistant direct current (DC) ignitor for use with a wood pellet burner assembly, comprising:
- a non-heating element portion, wherein the non-heating element portion is connected to at least one of a battery or an alternating current (AC) to DC electrical transformer attached to the wood pellet burner assembly;
- a heating element portion connected to the non-heating element portion, and configured to extend into a combustion region of the wood pellet burner assembly, wherein the heating element portion is configured to be heated by power received from the at least one of the battery or the AC to DC electrical transformer;
- an outer housing surrounding a mid section of an ignitor housing;
- a plurality of threads disposed in the outer housing; and
- a plurality of set screws disposed in the corresponding plurality of threads, and configured to hold the ignitor housing within the outer housing without the ignitor housing directly touching inner walls of the outer housing, wherein:
- the heating element portion is configured to extend through a pellet fuel slide of the wood pellet burner assembly;
- the DC ignitor is disposed in a substantially horizontal orientation;
- the wood pellet burner assembly includes a DC fan positioned to direct a flow of air in a substantially horizontal direction along the length of the DC ignitor, through perforations in the pellet fuel slide and into the combustion region;
- the AC to DC electrical transformer is configured to power the DC ignitor and the DC fan;
- the wood pellet burner assembly includes a body grounding lug, a user operable power switch, and a user-operable ignitor switch in communication between the AC to DC electrical transformer and the DC ignitor; and
- wherein the non-heating element portion is connected to the at least one of the battery or the AC to DC electrical transformer via the user-operable ignitor switch.

17. A high-temperature resistant direct current (DC) ignitor for use with a wood pellet burner assembly, comprising:
- a non-heating element portion, wherein the non-heating element portion is connected to at least one of a battery or an alternating current (AC) to DC electrical transformer attached to the wood pellet burner assembly;
- a heating element portion connected to the non-heating element portion, and configured to extend into a combustion region of the wood pellet burner assembly, wherein the heating element portion is configured to be heated by power received from the at least one of the battery or the AC to DC electrical transformer;
- an outer housing surrounding a mid section of an ignitor housing;
- a plurality of threads disposed in the outer housing;
- a plurality of set screws disposed in the corresponding plurality of threads, and configured to hold the ignitor housing within the outer housing without the ignitor housing directly touching inner walls of the outer housing, wherein the heating element portion is configured to extend through a pellet fuel slide of the wood pellet burner assembly;
- an ignitor holding flange connected to the outer housing, wherein the plurality of threads extend into the ignitor holding flange, and wherein the ignitor holding flange is configured to receive the plurality of set screws; and
- an annular combustion air intake opening at a terminal end of the outer housing, wherein the annular combustion air intake opening is configured to receive combustion air from outside the outer housing, wherein the outer housing is configured to guide the combustion air over the ignitor housing to cool the ignitor housing, and wherein the outer housing is configured to guide the combustion air toward the heating element portion to assist in combusting wood pellets disposed in the combustion region of the pellet burner assembly.

* * * * *